United States Patent
Kim et al.

(10) Patent No.: US 9,571,824 B2
(45) Date of Patent: Feb. 14, 2017

(54) STEREOSCOPIC IMAGE DISPLAY DEVICE AND DISPLAYING METHOD THEREOF

(71) Applicants: Beom-Shik Kim, Yongin (KR); Hui Nam, Yongin (KR); Jun-Il Kwon, Yongin (KR)

(72) Inventors: Beom-Shik Kim, Yongin (KR); Hui Nam, Yongin (KR); Jun-Il Kwon, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 697 days.

(21) Appl. No.: 13/894,600

(22) Filed: May 15, 2013

(65) Prior Publication Data

US 2014/0218472 A1  Aug. 7, 2014

(30) Foreign Application Priority Data

Feb. 6, 2013  (KR) .................. 10-2013-0013419

(51) Int. Cl.
| | |
|---|---|
| G06T 15/00 | (2011.01) |
| H04N 13/04 | (2006.01) |
| G06T 19/00 | (2011.01) |
| G06T 17/20 | (2006.01) |
| G06F 3/048 | (2013.01) |

(52) U.S. Cl.
CPC ...... H04N 13/0454 (2013.01); H04N 13/0475 (2013.01); H04N 13/0477 (2013.01); *G06F 3/048* (2013.01); *G06T 17/20* (2013.01); *G06T 19/00* (2013.01); *H04N 13/0468* (2013.01)

(58) Field of Classification Search
CPC ..... G06T 19/00; G06T 17/20; H04N 13/0468; G06F 3/048

USPC .............. 345/419; 715/848; 348/43, 42, 51
See application file for complete search history.

(56) References Cited

U.S. PATENT DOCUMENTS

| | | | |
|---|---|---|---|
| 2012/0056876 A1* | 3/2012 | Lee | H04N 13/0434 345/419 |
| 2012/0148147 A1* | 6/2012 | Ogata | H04N 13/0022 382/154 |

FOREIGN PATENT DOCUMENTS

| | | |
|---|---|---|
| KR | 10-2010-0009739 A | 1/2010 |
| KR | 10-2011-0064083 A | 6/2011 |
| KR | 10-1046259 B | 7/2011 |
| KR | 10-2012-0014433 A | 2/2012 |

* cited by examiner

*Primary Examiner* — Michael Lee
*Assistant Examiner* — Omer Khalid
(74) *Attorney, Agent, or Firm* — Lee & Morse P.C.

(57) ABSTRACT

A stereoscopic image display device includes a display including a plurality of pixels and displaying an image according to image data generated by processing an input video signal, and a controller for controlling the processing of an input video signal. The controller includes an image change gap setter for setting a first image change gap by using a user's reference input value, a calculation and correction unit for calculating an actual distance of the user who views a display image based on the user's observation position coordinate data, correcting the first image change gap corresponding to the actual distance, and calculating a second image change gap, and an image mode selector for selecting an image mode realized by the display, determining the user's position point with reference to the second image change gap, and generating image data for respective image modes.

20 Claims, 8 Drawing Sheets

STEREOSCOPIC IMAGE DISPLAY DEVICE AND DISPLAYING METHOD THEREOF

CROSS-REFERENCE TO RELATED APPLICATION

This application claims priority to and the benefit of Korean Patent Application No. 10-2013-0013419 filed in the Korean Intellectual Property Office on Feb. 6, 2013, the entire contents of which are incorporated herein by reference.

BACKGROUND

1. Field of the Invention

Embodiments relate to a stereoscopic image display device and a method for displaying a stereoscopic image.

2. Description of the Related Art

Today, multimedia services for digital terminals that allow users to view and hear by using a high-speed system of information configured by using a super-highway information network have been developed to hyperspace 3-dimensional (3D) info-communication services through which the users watch, feel, and enjoy realistically and stereoscopically beyond time and space.

In general, a stereoscopic image for expressing three dimensions is formed according to a stereo vision principle through two eyes in which the left eye and the right eye of a user respectively receive slightly different images because of a difference of positions of the eyes that occur due to the gap between the eyes of about 65 mm. The difference of images caused by the difference of the positions of the eyes is called a binocular disparity. A 3D stereoscopic image display device allows the left eye to watch the image provided for the left eye and the right eye to watch the image provided for the right eye by using the binocular disparity. That is, left and right eyes watch different 2D images, and when the two images are transferred to the brain through the retina, the brain reproduces depth perception and reality of an original 3D image by accurately fusing the two images.

Methods for driving stereoscopic images are divided into an autostereoscopic method and a stereoscopic method depending on hardware. To display images of two channels on one screen, the stereoscopic image display device outputs images for each channel by alternately changing the lines in the horizontal or vertical direction.

The autostereoscopic method controls the right-eye images to be transmitted to the right eye and the left-eye images to be transmitted to the left eye to thus display the stereoscopic images. The stereoscopic method controls the right-eye images so that the left eye may not watch them and controls the left-eye images so that the right eye may not watch them through special glasses, thereby expressing the stereoscopic images.

However, it is not easy for the stereoscopic image display device to realize stereoscopic images that are uniform and stable irrespective of the user's position. When the stereoscopic image display device is driven by the autostereoscopic method, a method for tracking the user position, shifting a liquid crystal electric field lens, and viewing the stereoscopic image regardless of the position has been developed. The method has a merit of increasing an area for the user to view the stereoscopic image in the autostereoscopic method, but it has a limit of expressing two-viewpoint images at any place.

The above information disclosed in this Background section is only for enhancement of understanding of the background and therefore it may contain information that does not form the prior art that is already known in this country to a person of ordinary skill in the art.

SUMMARY

One or more embodiments are directed to providing a stereoscopic image display device including a display including a plurality of pixels and displaying an image according to image data generated by processing an input video signal, and a controller for controlling the processing of an input video signal.

The controller may include an image change gap setter for setting a first image change gap by using a user's reference input value, a calculation and correction unit for calculating an actual distance of the user who views a display image based on the user's observation position coordinate data, correcting the first image change gap corresponding to the actual distance, and calculating a second image change gap, and an image mode selector for selecting an image mode realized by the display, determining the user's position point with reference to the second image change gap, and generating image data for respective image modes.

The image mode may include a multi-viewpoint image mode and a 2D/3D image mode.

In the multi-viewpoint image mode, the first image change gap and the second image change gap are lengths that correspond to a plurality of respective viewpoints that are generated by dividing an entire viewing angle by a predetermined first angle with reference to a reference distance between the user and the stereoscopic display device.

In the 2D/3D image mode, the first image change gap and the second image change gap are lengths that correspond to a normal area and an abnormal area for 3D viewing that are generated by dividing the entire viewing angle with reference to the reference distance.

When the selected image mode is a multi-viewpoint image mode, the image mode selector may include a multi-viewpoint image storage unit for storing a plurality of 3D image data that are generated by converting the input video signal corresponding to the multi-viewpoint, a multi-viewpoint image converter for converting the input video signal into a plurality of 3D image data in real-time for the respective multi-viewpoints, and a viewpoint image selector for selecting a viewpoint corresponding to the eyes at the user's position point from the multi-viewpoints with reference to the second image change gap in the multi-viewpoint image mode, and receiving 3D image data following the respective viewpoints from the multi-viewpoint image storage unit or the multi-viewpoint image converter.

When the selected image mode is a 2D/3D image mode, the image mode selector may include a 3D image storage unit for storing a plurality of 3D image data converted from the input video signal, a 2D/3D image converter for converting 2D image data of the input video signal into 3D image data in real-time, and a 2D/3D image selector for selecting a corresponding area caused by the user's position point from among the normal area and the abnormal area for 3D viewing with reference to the second image change gap in the 2D/3D image mode, and receiving 3D image data from the 3D image storage unit or 2D/3D image converter or 2D image data as the input video signal.

When the selected image mode is a multi-viewpoint image mode, the reference input value includes the user's reference distance for the display image, an entire viewing angle, a number of multi-viewpoints, and an angle for a single viewpoint when the entire viewing angle is divided by the multi-viewpoints.

When the selected image mode is a 2D/3D image mode, the reference input value includes the user's reference distance for the display image, an entire viewing angle, an angle of a normal area for 3D viewing, and an angle of an abnormal area for 3D viewing.

The stereoscopic image display device may further include an image capture unit for photographing the user who faces the display image and views the same, and acquiring image information of a position tracking target, and a camera including a position tracker for receiving image information of the position tracking target and acquiring the user's observation position coordinate data.

The position tracking target may be the user's face or eyes.

The stereoscopic image display device may further include a marker recognizer for sensing a marker of 3D glasses the user wears and acquiring image information of the marker, and a camera including a marker position tracker for receiving image information of the marker and acquiring position information of the marker as the user's observation position coordinate data.

The 3D glasses may be polarizing glasses or shutter glasses.

Another embodiment provides a method for displaying a stereoscopic image including, the method including acquiring observation position coordinate data of a user who views a display image, calculating the user's actual distance by using the observation position coordinate data, correcting a predetermined first image change gap according to an image mode and calculating a second image change gap corresponding to the actual distance, and determining a user's position point with reference to the second image change gap in the first image mode selected from among the image modes and generating image data of the first image mode corresponding to the point.

Acquiring the observation position coordinate data may include photographing the user who faces the display image and views the same and acquiring image information of the position tracking target, and receiving image information of the position tracking target and acquiring the observation position coordinate data according to a position tracking algorithm.

Acquiring the observation position coordinate data may include sensing a marker of 3D glasses the user wears and acquiring image information of the marker, and receiving image information of the marker and acquiring position information of the marker as the observation position coordinate data.

The first image mode may be one of a multi-viewpoint image mode and a 2D/3D image mode, the multi-viewpoint image mode selects a viewpoint of eyes at the user's position point from among the multi-viewpoints with reference to the second image change gap and displays 3D image data following the respective viewpoints, and the 2D/3D image mode selects a corresponding area following the user's position point from among the normal area and the abnormal area for 3D viewing with reference to the second image change gap and displays the input video signal as 2D image data or converted 3D image data.

The image mode may include a multi-viewpoint image mode and a 2D/3D image mode, and in the multi-viewpoint image mode, the first image change gap and the second image change gap are lengths that correspond to a plurality of respective viewpoints that are generated by dividing an entire viewing angle by a predetermined the first angle with reference to a reference distance between the user and the stereoscopic display device, while in the 2D/3D image mode, the first image change gap and the second image change gap are lengths that correspond to a normal area and an abnormal area for 3D viewing that are generated by dividing the entire viewing angle with reference to the reference distance.

The first image change gap may be set when the user inputs a reference input value for the respective image modes.

Generating the image data of the first image mode may include, when the first image mode is a multi-viewpoint image mode, receiving 3D image data following the viewpoint that corresponds to the user's position point from the 3D image data converted and stored from the input video signal corresponding to the multi-viewpoints, or receiving the 3D image data that are converted in real-time from the input video signal according to the viewpoint that corresponds to the user's position point.

Generating the image data of the first image mode may include, when the first image mode is a 2D/3D image mode, receiving 3D image data that are stored or converted in real-time according to the corresponding area following the user's position point from among a normal area and an abnormal area for 3D viewing, or receiving 2D image data of an input video signal.

DETAILED DESCRIPTION

Figure 1:
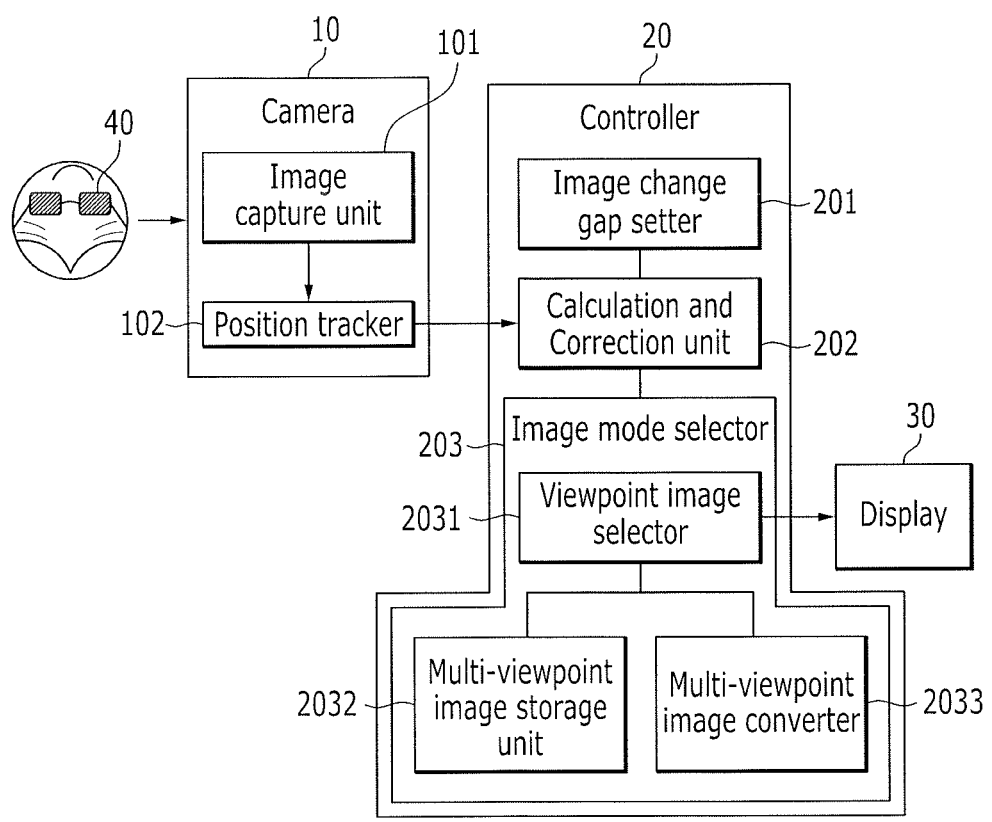
FIG. 1 shows a block diagram of a stereoscopic image display device according to an exemplary embodiment.

In the following detailed description, only certain exemplary embodiments have been shown and described, simply by way of illustration. As those skilled in the art would realize, the described embodiments may be modified in various different ways, all without departing from the spirit or scope of the present disclosure.

Accordingly, the drawings and description are to be regarded as illustrative in nature and not restrictive, and like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

FIG. 1 shows a block diagram of a stereoscopic image display device (also called a display device hereinafter) according to an exemplary embodiment. In FIG. 1, the stereoscopic image display device includes a camera 10, a controller 20, and a display 30 for displaying an image. A driving circuit including a scan driver, a gate driver, and a data driver for displaying a stereoscopic image to the display 30 does not relate to a configuration for showing a technical feature of the embodiment, so it is not shown in FIG. 1, and as it is known to a person skilled in the art, its description will be omitted.

The camera 10 is an image capture device for photographing a user who faces a display device and watches images. Particularly, the camera 10 photographs the user (viewer) who wears 3D glasses 40 and sits before the stereoscopic image display device according to the embodiment to view the stereoscopic image.

Figure 2:
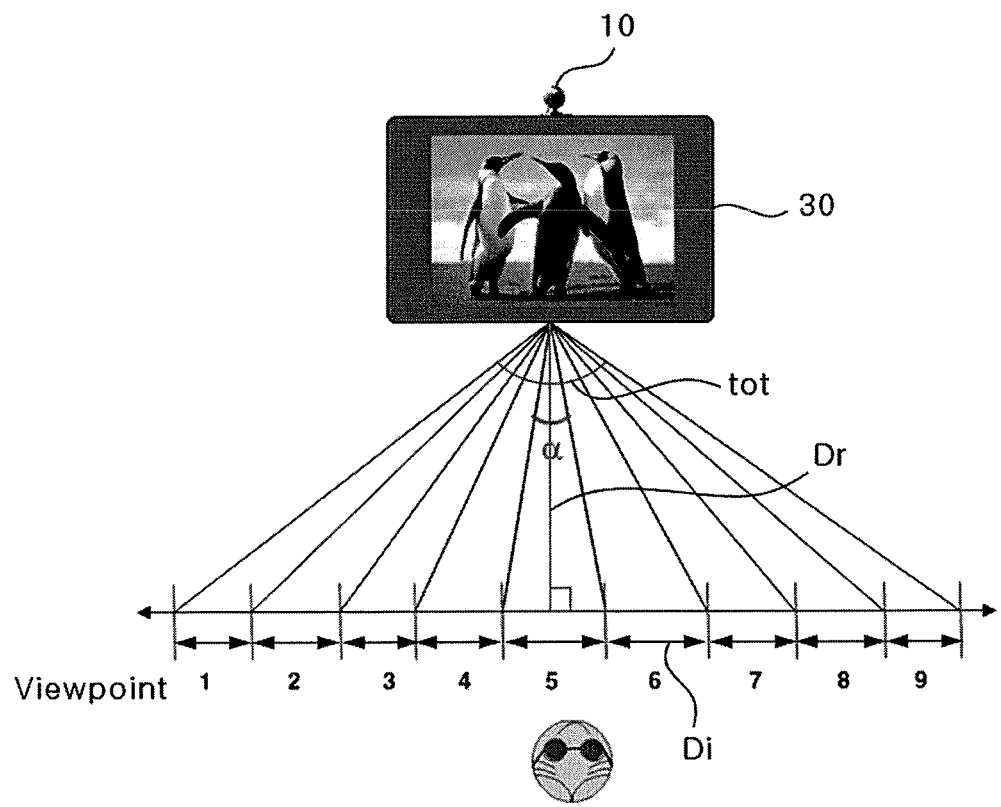
FIG. 2 shows a viewpoint image change gap in realizing a multi-viewpoint image of a stereoscopic image display device according to an exemplary embodiment.

The camera 10 may be mounted inside the stereoscopic image display device. In addition, as shown in FIG. 2, the camera 10 may be configured to be provided outside the stereoscopic image display device, e.g., at a top of the display 30.

The camera 10 includes an image capture unit 101 and a position tracker 102. The image capture unit 101 photographs the user who views the stereoscopic image and acquires image data information on a position tracking target. The position tracker 102 receives the image data from the image capture unit 101 to acquire position information of the user, and transmits the position information to the controller 20 of the display device.

Here, the user's position information is position coordinate data corresponding to the position of the user's face or eyes. The position coordinate data may be determined by applying a position tracking algorithm to the position of the user's face or eyes at a predetermined position. The position tracking algorithm is not limited, and a position tracking program may be any known to a skilled person.

The controller 20 includes an image change gap setter 201, a calculation and correction unit 202, and an image mode selector 203. The controller 20 is to realize a technical feature of the embodiment, and a control unit for controlling a driving circuit of a general display device will not be described, since it does not relate to the embodiment.

The image change gap setter 201 sets an image change gap caused by the user's appropriate position according to the stereoscopic image mode selected by the user.

Regarding the stereoscopic image display device according to the embodiment, the stereoscopic image mode includes a mode (multi-viewpoint image mode hereinafter) for displaying an image caused by multi-viewpoints that correspond to each user's movement of position before the display device, and a mode (2D/3D image mode hereinafter) for displaying a 2D or 3D image caused by a normal area within a range in which the 3D image is normally seen according to the user's position movement and an abnormal area.

The image change gap conceptually includes an image change gap relating to the multi-viewpoints and an image change gap relating to the normal/abnormal area of 3D displaying depending on the stereoscopic image mode.

The stereoscopic image mode is selected in advance by the user, and the image change gap setter 201 sets the image change gap according to the stereoscopic image mode set by the user.

In detail, when the multi-viewpoint image mode is selected by the user, the image change gap represents a gap that corresponds to the multi-viewpoints caused by the user's position movement. When the 2D/3D image mode is selected, the image change gap represents a gap of the normal area and the abnormal area following the user's position movement.

That is, the image change gap represents a straight-line distance in one direction corresponding to a change angle when the same image is differently recognized by the user as the position of the user who faces the display device and views the image is changed in one direction. The image change gap is set for a reference distance (a straight-line distance when the user stands in front of the camera) between the camera and the user.

The image change angle is changeable by the selected image mode.

In the exemplary embodiment (the first exemplary embodiment hereinafter) in which the user selects the multi-viewpoint image mode, the image change gap is set by the reference input value that is input by the user. The reference input value includes a reference distance between the camera and the user, an entire viewing angle, a number of viewpoints, and an angle of a single viewpoint. Therefore, the image change gap setter 201 can set the same image change gap corresponding to each single viewpoint.

In detail, referring to FIG. 2, the image change gap of the multi-viewpoint image mode signifies a length (Di) caused by each viewpoint (e.g., 1 to 9). Therefore, to set the image change gap (Di) of the multi-viewpoint image mode, the reference input value, the reference distance (Dr), the entire viewing angle (tot), and the number of viewpoints are set by the user. The image change gap (Di) for a single viewpoint is calculated. In addition, the image change gap (Di) for the single viewpoint can be calculated by inputting the reference distance (Dr) and an angle ($\alpha$) for the single viewpoint as the reference input value.

The viewpoint exemplified in FIG. 2 does not indicate one position point, and it includes a length range corresponding to respective division gaps generated when the entire viewing angle (tot) is divided by the angle ($\alpha$) for the same single viewpoint.

In the exemplary embodiment (the second exemplary embodiment hereinafter) in which the user selects the 2D/3D image mode, the image change gap that is set by the user's reference input value in the image change gap setter 201 represents a gap of the normal area and the abnormal area for 3D viewing. That is, referring to FIG. 6 in which realization of the 2D/3D image is exemplified, the image change gap of the 2D/3D image mode represents, with respect to the reference distance (Dr), a straight-line distance (Di_3) in one direction corresponding to an angle ($\beta$ in FIG. 6) of the normal area for 3D viewing or a straight-line distance (Di_1 and Di_2) in one direction corresponding to an angle (angle of (entire viewing angle (tot) minus $\beta$) in FIG. 6) of the abnormal area.

Therefore, the reference input value of the 2D/3D image mode includes the reference distance (Dr) between the camera and the user, the entire viewing angle (tot), the angle ($\beta$) of the normal area, and the angle of the abnormal area.

Referring to FIG. 1, the calculation and correction unit 202 calculates the actual distance between the camera and the user based on the user's position coordinate captured in real-time by the camera 10. The image change gap setter 201 corrects the image change gap according to an image change gap established by the user and an actual distance between the camera and the user.

That is, the actual distance between the camera and the user calculated from the position information data transmitted from the camera is different from the reference distance (Dr) that is used to set the image change gap by the image change gap setter 201. Therefore, the distance difference is applied to control the image change gap.

The image change gap may be set at a reference distance, e.g., one meter, as the reference input value. As the actual distance increases, the image change gap for each viewpoint also increases. As the actual distance decreases, the image change gap for each viewpoint also decreases.

In the first exemplary embodiment with the multi-viewpoint image mode, if the actual distance increases, a user's binocular viewpoint can be a same viewpoint, though the binocular viewpoint is different when using the image change gap established according to the reference input value in the image change gap setter 201.

In the second exemplary embodiment with the 2D/3D image mode, if the actual distance increases, the user's position information can belong to a 3D area, though it belongs to a 2D area when using the image change gap established according to the reference input value in the image change gap setter 201.

The image mode selector 203 selects an image mode displayed by the stereoscopic image display device. That is, the image mode selector 203 selects an operation according to the multi-viewpoint image mode as shown in the first exemplary embodiment or an operation according to the 2D/3D image mode as shown in the second exemplary embodiment.

The image mode selector 203 includes a corresponding configuration for controlling respective drives according to the image display mode selected by the user.

Figure 5:
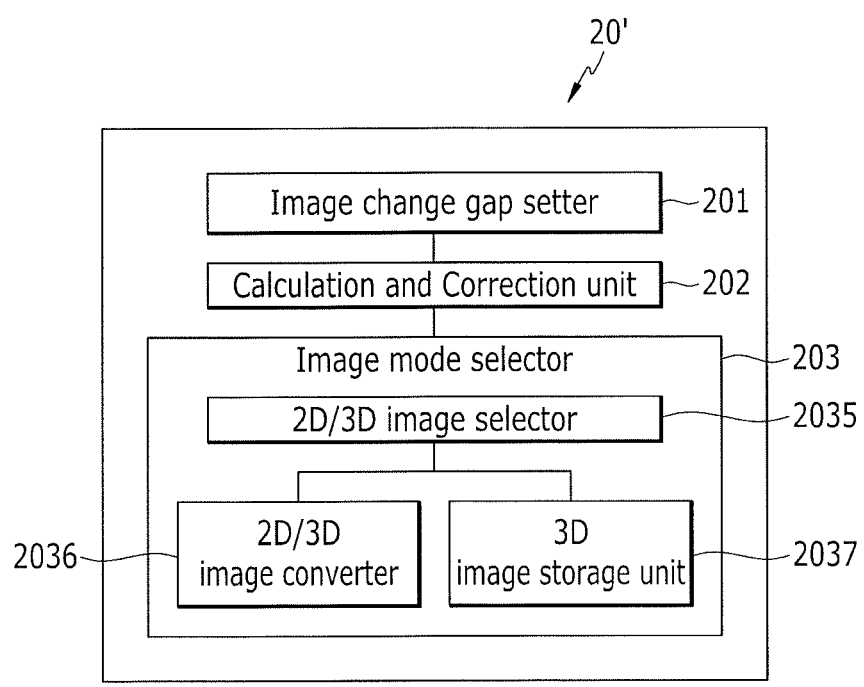
FIG. 5 shows a block diagram of a configuration of a controller in a stereoscopic image display device according to another exemplary embodiment.

For better understanding and ease of description, a detailed configuration of the image mode selector 203 is shown in FIG. 1 and FIG. 5, and the image mode selector 203 includes configurations shown in FIG. 1 and FIG. 5.

In detail, as shown in FIG. 1, when the multi-viewpoint image mode according to the first exemplary embodiment is selected, the image mode selector 203 performs a multi-viewpoint image display by a viewpoint image selector 2031, a multi-viewpoint image storage unit 2032, and a multi-viewpoint image converter 2033.

When the user selects the 2D/3D image mode according to the second exemplary embodiment, as shown in FIG. 5, the image mode selector 203 performs a 2D image or 3D image display by a 2D/3D image selector 2035, a 2D/3D image converter 2036, and a 3D image storage unit 2037. The image mode selector 203 according to the second exemplary embodiment will be described later.

The image mode selector 203 according to the first exemplary embodiment shown in FIG. 1 is set to be in the multi-viewpoint image mode by the user's input. In FIG. 1, the viewpoint image selector 2031 receives information on the actual distance between the user (observer) and the camera calculated by the calculation and correction unit 202 and the image change gap that is corrected according to the actual distance.

In the multi-viewpoint image mode, the viewpoint image selector 2031 selects a viewpoint that corresponds to the eyes from among the multi-viewpoint according to the user's position, and selects an image that corresponds to the corresponding viewpoints. The image that corresponds to the corresponding viewpoints is transmitted from the multi-viewpoint image storage unit 2032 or the multi-viewpoint image converter 2033.

Figure 3:
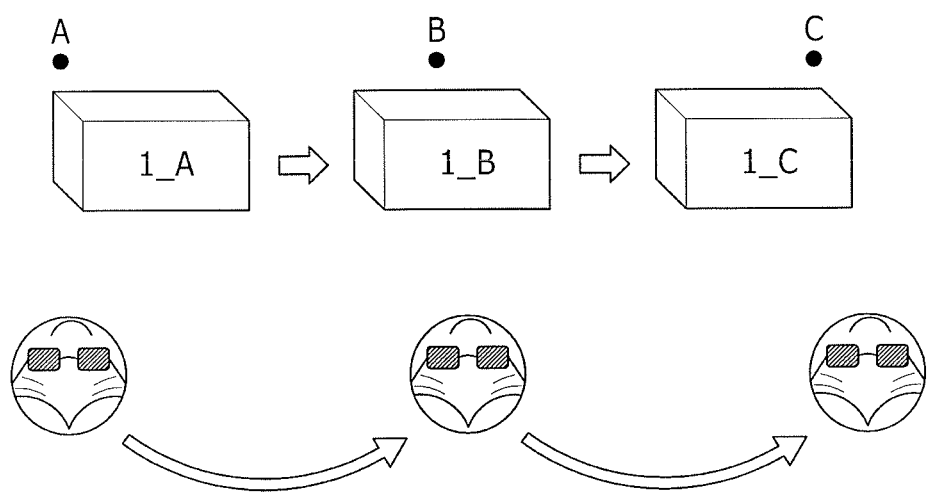
FIG. 3 shows a schematic view of displaying states of a same image for respective viewpoints according to a user position.

That is, the same object displays different images depending on the respective multi-viewpoints, which is checked with reference to FIG. 3. FIG. 3 shows different images of the rectangular parallelepiped for three viewpoints (A to C). When the user moves in one direction (e.g., a horizontal direction), the user sees an image 1_A at the viewpoint A, an image 1_B at the viewpoint B, and an image 1_C at the viewpoint C depending on position.

In the multi-viewpoint image mode according to the first exemplary embodiment, the dynamic 3D stereoscopic image is realized by displaying the corresponding viewpoint images 1_A and 1_B when the viewpoints are A and B are different depending on the binocular position.

In FIG. 1, the viewpoint image selector 2031 selects viewpoints of the eyes from the corrected image change gap according to the user's position information data. The multi-viewpoint image storage unit 2032 transmits display images to the viewpoint image selector 2031. The displayed images correspond to the viewpoints according to the position of the user from among a plurality of multi-viewpoint images.

The multi-viewpoint image storage unit 2032 can store the plurality of multi-viewpoint images in advance. The plurality of multi-viewpoint images can be 3D image data converted from the input 2D image data corresponding to the multi-viewpoints. The multi-viewpoint image converter 2033 may receive the 2D image data and may convert them to the 3D image data for respective multi-viewpoints according to the image change gap in advance.

Alternatively, the multi-viewpoint image converter 2033 may convert, in real-time, the 3D image according to respective viewpoints that correspond to the user's position information determined by the viewpoint image selector 2031 for the 2D image data that are input in real-time. The converted 3D image according to the corresponding viewpoint is transmitted to the viewpoint image selector 2031.

The display 30 includes a plurality of pixels that are driven by a data voltage caused by an image data signal and display an image. The display 30 displays an image that corresponds to 3D display image data for corresponding viewpoints that correspond to the binocular viewpoint caused by the user's position processed by the viewpoint image selector 2031. The 3D display image data processed by the viewpoint image selector 2031 of the controller 20 are transmitted to the display 30 through the data driver, which is known to a person skilled in the art and is not shown in FIG. 1.

In the first exemplary embodiment, when the user faces the display device and moves in one direction (e.g., in the right or left direction), the user's position is tracked by the camera attached to the display device, and the images of the respective viewpoints that correspond to the binocular position are displayed. The user then views images with various viewpoints according to motion to feel motion disparity and view dynamic images. The 3D glasses 40 the user wears is for a stereoscopic display device, e.g., polarizing glasses or shutter glasses.

Figure 4:
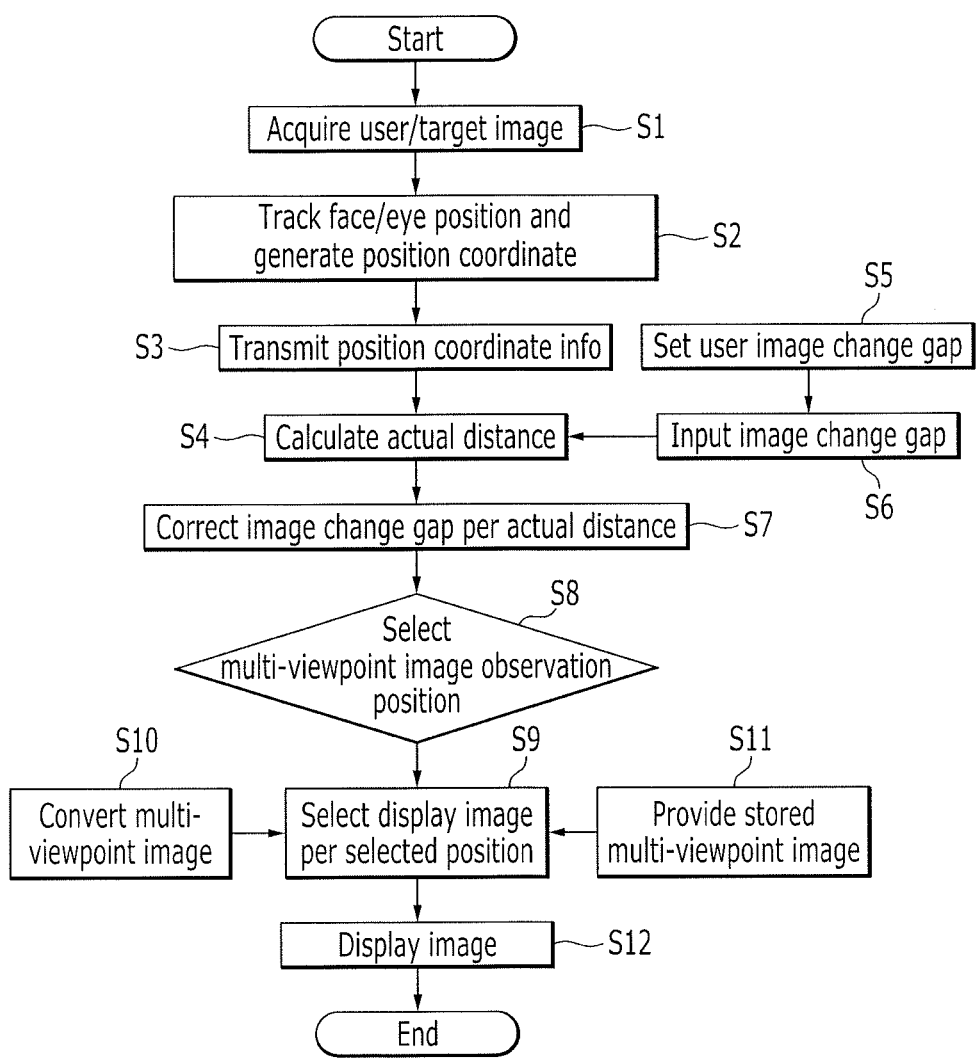
FIG. 4 shows a flowchart of a method for displaying a stereoscopic image by a stereoscopic image display device of FIG. 1.

FIG. 4 shows a flowchart for displaying an image according to a multi-viewpoint image mode according to a first exemplary embodiment.

An image of the user who faces the stereoscopic image display device and views images is photographed to acquire target image data of eyes or face (S1).

The user's face or eye position is tracked to generate position coordinate data (S2). The process is performed by the camera externally attached to the display device or internally included in it.

The position coordinate data of the observation target are transmitted to the controller so as to realize the 3D image in various manners based upon the actual distance from the camera (S3).

The controller uses the position coordinate data to calculate the actual distance between the user and the camera (S4). The controller can receive the image change gap. The image change gap is set using the reference input value input by the user in S5 and is input to the controller in S6.

The image change gap following the actual distance is corrected by using the actual distance between the user and the camera acquired during the processes S4 and S6 and the information on the image change gap set by the user (S7).

The flowchart of FIG. 4 shows the case in which the image mode selector of the controller selects the multi-viewpoint image mode, and when the image change gap is corrected in S7, the user's observation position is selected with reference to the corrected image change gap (S8). That is, it is determined to which viewpoint the user's observation position corresponds from among the predetermined multi-viewpoints by using the users observation position coordinate data based on the corrected image change gap.

When the viewpoint of the user's observation position is determined in the multi-viewpoint image mode, the display image following the corresponding viewpoint can be selected (S9).

The display image matching the corresponding viewpoint may be image data having different formats according to the viewpoints, and can be stored 3D stereoscopic image data if an input signal is not input in real-time. That is, the 3D image data signal may be stored for each viewpoint (S11), and the 3D image data signal corresponding to the viewpoint caused by the observation position is selected during S9.

When the input signal is input in real-time, it can be converted into the 3D image data signal (S10), and the converted 3D image data signal can be transmitted.

The image mode selector of the controller acquires the display images for respective viewpoints caused by the observation positions through S10 or S11, and displays the image to the display through the data driver (S12).

FIG. 5 shows a block diagram of a configuration of a controller 20' in a stereoscopic image display device according to another exemplary embodiment. In detail, FIG. 5 shows a configuration of an image mode selector 203 according to a second exemplary embodiment when a 2D/3D image mode is selected.

In the second exemplary embodiment, the controller includes an image change gap setter 201, a calculation and correction unit 202, and an image mode selector 203.

In the 2D/3D image mode according to the second exemplary embodiment, the image change gap represents a gap between an area in which the 3D display is normal and an area in which the 3D display is abnormal. The user's reference input value for setting the image change gap has been exemplified in the above.

Referring to FIG. 5, the image mode selector 203 includes a 2D/3D image selector 2035, a 2D/3D image converter 2036, and a 3D image storage unit 2037, so as to control respective drives according to the 2D/3D image display mode selected by the user.

When the image mode selector 203 is set to be in the 2D/3D image mode by the user's input value, the 2D/3D image selector 2035 determines whether to realize the input video signal as 2D or 3D.

For this purpose, the 2D/3D image selector 2035 receives an actual distance between the user (observer) and the camera calculated by the calculation and correction unit 202, and information on the image change gap corrected by the actual distance.

The actual distance is calculated by the calculation and correction unit 202 by receiving the user's observation position coordinate data by the camera. Further, the corrected image change gap is generated by correcting the image change gap set by the image change gap setter 201 according to the user's reference input value, that is, the respective gaps of the 3D area (Di_3) and the 2D areas (Di_1) and (Di_2) of FIG. 6 corresponding to the actual distance between the camera and the user by the calculation and correction unit 202.

Figure 6:
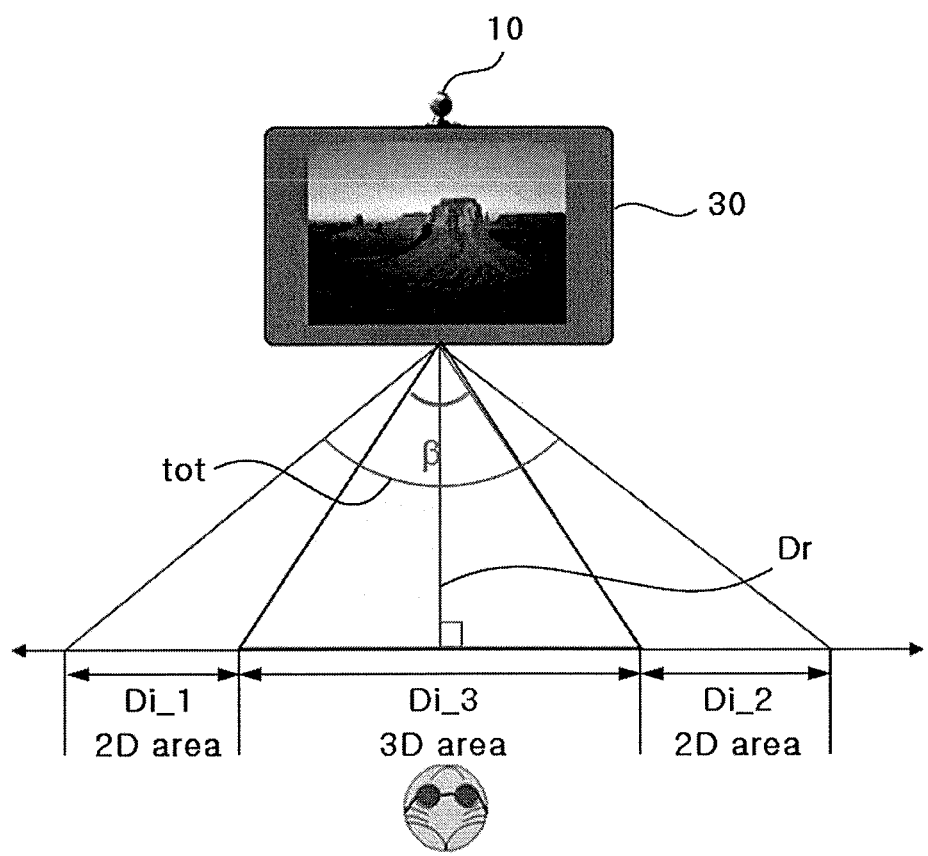
FIG. 6 shows a drive method for respective user positions in realizing a 2D/3D image in a stereoscopic image display device according to another exemplary embodiment.

Referring to FIG. 6, when the 3D stereoscopic image is displayed and the user is within a predetermined range in the center of the display device in the entire viewing range (tot), the 3D stereoscopic image is normally displayed, and when the user digresses from the range and moves to the right or left, the left-eye image and the right-eye image may be reversed, which may make the user feel dizzy and unable normally recognize the 3D stereoscopic image.

The area in which the 3D stereoscopic image is normally recognized is called a 3D area, the area in which the 3D stereoscopic image is abnormally recognized is called a 2D area, and a straight-line distance of the 3D area (Di_3) and the 2D areas (Di_1) and (Di_2) corresponding to a predetermined reference distance (Dr) is defined to be an image change gap.

Therefore, the image change gap set by the image change gap setter 201 according to the user's reference input value is a value that is set according to the reference distance (Dr) so the calculation and correction unit 202 corrects the image change gap into a value that is variable according to the actual distance.

The 2D/3D image selector 2035 uses the actual distance and information on the corrected image change gap to find a point within the image change gap corresponding to the user's actual observation position. That is, the 2D/3D image selector 2035 determines which point the user's actual observation position corresponds to from among the image change gap of the 3D area (Di_3) and the 2D areas (DU) and (Di_2). When the user's actual observation position belongs to the range of the 3D area (Di_3), the input video signal is displayed as a 3D image, and when it belongs to the range of the 2D areas (Di_1) and (Di_2), the input video signal is displayed as a 2D image.

When the user's actual observation position belongs to the range of the 3D area (Di_3) to display the 3D image, the 3D image data are received through the 2D/3D image converter 2036 or the 3D image storage unit 2037.

The 3D image storage unit 2037 stores converted 3D image data for the input video signal. That is, the 3D image storage unit 2037 stores 3D image data previously converted from the input 2D image data corresponding to the eyes.

The 3D image data stored in the 3D image storage unit 2037 may be generated by receiving the 2D image data and converting them according to the binocular viewpoint by the 2D/3D image converter 2036.

The 3D image storage unit 2037 transmits the stored 3D image data to the 2D/3D image selector 2035 when the user's observation position is selected to be the 3D area by the 2D/3D image selector 2035.

As another embodiment, 3D image data are transmitted from the 2D/3D image converter 2036 when the user observation position is selected to be the 3D area by the 2D/3D image selector 2035. That is, the 2D/3D image converter 2036 converts the real-time input 2D image data to the 3D image data according to the viewpoints of the eyes and transmits the 3D image data to the 2D/3D image selector 2035.

When the user observation position is selected to be the 2D area, the 2D/3D image selector 2035 transmits the 2D image data to the display according to the input image data signal to thus display the 2D image.

Therefore, according to the 2D/3D image mode of the second exemplary embodiment, the 3D image is displayed when the user is positioned in the range where the 3D image is stably realized, and the 2D image is displayed in other ranges, so the device instantly reacts to the user's position to allow the user to experience various types of images. Further, the above-noted drive method allows the user to view the display images without feeling fatigue.

Figure 7:
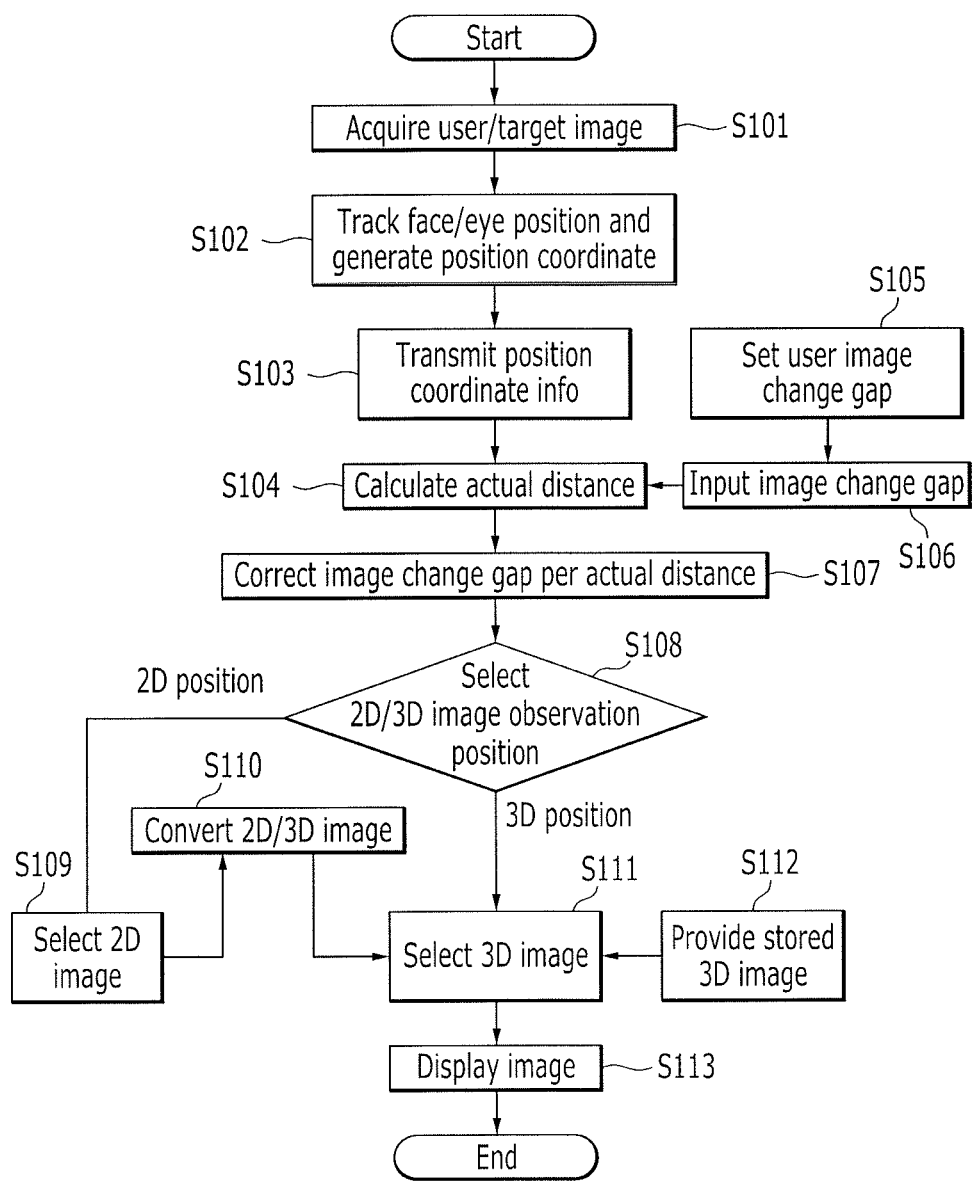
FIG. 7 shows a flowchart of a method for displaying a stereoscopic image in a stereoscopic image display device according to another exemplary embodiment of FIG. 5.

FIG. 7 shows a flowchart of a method for displaying a stereoscopic image in a stereoscopic image display device according to another exemplary embodiment of FIG. 5.

An image of the user facing the stereoscopic image display device and viewing images is photographed to acquire target image data of eyes or a face (S101).

The position of the user's face or eyes is tracked to generate position coordinate data (S102), which is performed by a camera externally attached to the display device or internally included in it.

The position coordinate data of the observation target are transmitted to the controller so that they may be realized into 2D images or 3D images based on the actual distance from the camera (S103).

The controller of FIG. 5 uses the position coordinate data to calculate the actual distance between the user and the camera (S104). In this instance, the controller receives information on the image change gap that is calculated during the process S105 for setting the image change gap (S106). The image change gap that is set during S105 is calculated according to the reference input value that is input by the user.

The image change gap following the actual distance is corrected by using the actual distance between the user and the camera acquired in S104 and S106 and the information on the image change gap set by the user (S107).

An area that corresponds to the user's actual observation position is determined based on the corrected image change gap, and the area is then selected (S108). That is, the position in the image change gap corresponding to the user's observation position is checked in the 2D/3D image mode.

When the point is positioned in the 2D area, the 2D image drive method is selected (S109), the 2D image data are transmitted in real-time according to the video signal that is input from the outside, and the 2D image is displayed on the display (S113).

When the point is positioned in the 3D area, the 3D image drive method is selected (S111) which may be realized by one of two methods.

That is, as described with reference to FIG. 5, the 3D image data stored in the 3D image storage unit 2037 are received (S112), or the 2D/3D image converter 2036 converts the 2D image data that are input in real-time into 3D image data (S110). Upon receiving the stored 3D image data or the real-time converted 3D image data and receiving the 3D image data through a data driver, the display displays the 3D image (S113).

Figure 8:
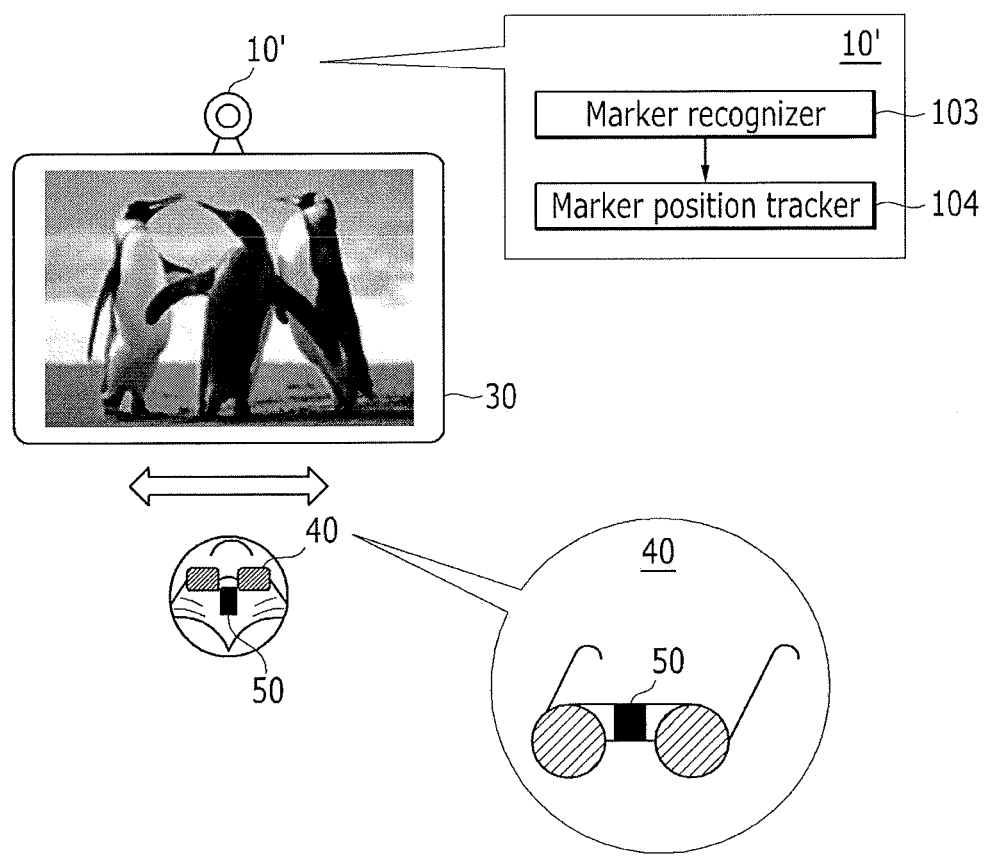
FIG. 8 shows a block diagram of a partial configuration of a stereoscopic image display device according to another exemplary embodiment.

FIG. 8 shows a block diagram of a partial configuration of a stereoscopic image display device according to another exemplary embodiment. The embodiment of FIG. 8 represents a stereoscopic image display device for performing the multi-viewpoint image mode and the 2D/3D image mode, and it includes a camera, a controller, and a display shown in FIG. 1. The configuration and the function of the controller and the display correspond to the exemplary embodiment of FIG. 1 and will not be described. FIG. 8 shows a different configuration of a camera 10' for tracking the user's observation position, differing from the exemplary embodiment of FIG. 1.

That is, the camera 10' of the stereoscopic image display device of FIG. 8 represents a camera for tracking a position of a marker 50. In detail, the camera 10' recognizes the marker 50 to acquire the user's position coordinate data. The marker 50 may be positioned on the user, e.g., may be inserted into the user's 3D glasses 40.

The camera 10' of FIG. 8 includes a marker recognizer 103 for sensing the marker, photographing the same, and acquiring an image of the marker, and a marker position tracker 104 for receiving the photographed marker image data to acquire position information of the marker, and generating the same as the user's observation position coordinate data.

The marker position information represents the position coordinate data of the marker that are found by using a position tracking algorithm, and the marker 50 is attached to the user's 3D glasses 40 to substitute for the actual observation position coordinate data of the user facing the display device.

The marker position information calculated by the marker position tracker 104 is transmitted to the controller, and it is used for the stereoscopic image display according to the first exemplary embodiment or the second exemplary embodiment.

By way of summation and review, the stereoscopic image display device of a shutter-glasses type according to one or more embodiments displays multi-viewpoint stereoscopic images for respective user positions by using the wide viewing angle characteristic compared to the conventional autostereoscopic-type stereoscopic image display having the two-viewpoint image realization limit. Therefore, stable and uniform stereoscopic images are provided irrespective of the user position.

Further, according to one or more embodiments, 2D or 3D images are selectively displayed depending on the user position to allow the user to experience new image realization and provide visual convenience when the images are watched.

The drawings and the detailed description described above are examples for the present invention and are provided to explain the present invention, and the scope of the present invention described in the claims is not limited thereto. Therefore, those having ordinary skill in the art will appreciate that various modifications or changes and other equivalent embodiments are possible from the exemplary embodiments. Further, a person of ordinary skill in the art can omit part of the constituent elements described in the specification without deterioration of performance, or can add constituent elements for better performance. In addition, a person of ordinary skill in the art can change the specification depending on the process conditions or equipment.

Hence, the range of the present invention is to be determined by the claims and equivalents.

What is claimed is:

1. A stereoscopic image display device, comprising:
a display including a plurality of pixels, the display that displays an image according to image data generated by processing an input video signal; and
a controller that controls the processing of an input video signal, wherein the controller includes:
an image change gap setter that sets a first image change gap by using a user's reference input value, the first image change gap including a plurality of first lengths, the first lengths being arranged in a direction and being apart from the stereoscopic image display device,
a calculator that calculates an actual distance between the user who views a display image and the stereoscopic image display device based on the user's observation position coordinate data and calculates a second image change gap including a plurality of second lengths, the second lengths generated by correcting the first lengths of the first image change gap according to the actual distance, and
an image mode selector that selects one of image modes of the stereoscopic image display device, determines the user's position point with reference to the second lengths of the second image change gap, and generates image data for the selected image mode.

2. The stereoscopic image display device of claim 1, wherein:
the image modes include a multi-viewpoint image mode and a 2D/3D image mode,
in the multi-viewpoint image mode, the first lengths of the first image change gap and the second lengths of the second image change gap correspond to a plurality of respective viewpoints generated by dividing an entire viewing angle by a predetermined first angle with reference to a reference distance between the user and the stereoscopic image display device, and
in the 2D/3D image mode, the first lengths of the first image change gap and the second lengths of the second image change gap correspond to a normal area and an abnormal area for 3D viewing generated by dividing the entire viewing angle with reference to the reference distance.

3. The stereoscopic image display device of claim 1, wherein, when the selected image mode is a multi-viewpoint image mode, the image mode selector includes:
a multi-viewpoint image storage unit that stores a plurality of 3D image data corresponding multi-viewpoints and being generated by converting the input video signal;
a multi-viewpoint image converter that converts the input video signal into the plurality of 3D image data in real-time for the respective multi-viewpoints; and
a viewpoint image selector that selects viewpoints corresponding to eyes at the user's position point from the multi-viewpoints according to the user's position point and receives 3D image data corresponding to the selected viewpoints from the multi-viewpoint image storage unit or the multi-viewpoint image converter.

4. The stereoscopic image display device of claim 1, wherein, when the selected image mode is 2D/3D image mode, the image mode selector includes:
a 3D image storage unit that stores a plurality of 3D image data converted from the input video signal;
a 2D/3D image converter that converts 2D image data of the input video signal into the plurality of 3D image data in real-time; and
a 2D/3D image selector that selects a corresponding area according to the user's position point from among the normal area and the abnormal area for 3D viewing with reference to the second image change gap in the 2D/3D image mode, and receives the plurality of 3D image data from the 3D image storage unit or 2D/3D image converter or the 2D image data as the input video signal.

5. The stereoscopic image display device of claim 1, wherein, when the selected image mode is a multi-viewpoint image mode, the user's reference input value includes the user's reference distance for the display image, an entire viewing angle, a number of multi-viewpoints, and an angle for a single viewpoint when the entire viewing angle is divided into a plurality of angles corresponding to multi-viewpoints.

6. The stereoscopic image display device of claim 1, wherein, when the selected image mode is a 2D/3D image mode, the user's reference input value includes the user's reference distance for the display image, an entire viewing angle, an angle of a normal area for 3D viewing, and an angle of an abnormal area for 3D viewing.

7. The stereoscopic image display device of claim 1, wherein the stereoscopic image display device further includes:
an image capture unit that photographs the user who faces the display image and views the same, and acquires image information of a position tracking target; and
a camera including a position tracker that receives image information of the position tracking target and acquires the user's observation position coordinate data.

8. The stereoscopic image display device of claim 7, wherein the position tracking target is the user's face or eyes.

9. The stereoscopic image display device of claim 1, further comprising a camera, wherein the camera includes:
a marker recognizer that senses a marker of 3D glasses the user wears and acquire image information of the marker; and
a marker position tracker that receives the image information of the marker and acquires position information of the marker as the user's observation position coordinate data.

10. The stereoscopic image display device of claim 9, wherein the 3D glasses are polarizing glasses or shutter glasses.

11. A method for displaying a stereoscopic image, the method comprising:
acquiring observation position coordinate data of a user who views a display image;
calculating the user's actual distance between the user and a stereoscopic image display device by using the observation position coordinate data;
correcting a first image change gap according to an image mode, the first image change gap including a plurality of first lengths, the first lengths being arranged in a direction and being apart from the stereoscopic image display device;
calculating a second image change gap including a plurality of second lengths distances, the second lengths generated by modifying the first lengths of the first image change gap according to the actual distance; and
determining the user's position point with reference to the second lengths of the second image change gap in the image mode and generating image data for the image mode according to the deterinined user's position point.

12. The method of claim 11, wherein the acquiring of observation position coordinate data includes:
   photographing the user who faces the display image and views the same, and acquiring image information of a position tracking target; and
   receiving the image information of the position tracking target and acquiring the observation position coordinate data according to a position tracking algorithm.

13. The method of claim 11, wherein acquiring the observation position coordinate data includes:
   sensing a marker of 3D glasses the user wears and acquiring image information of the marker; and
   receiving the image information of the marker and acquiring position information of the marker as the observation position coordinate data.

14. The method of claim 11, wherein:
   the first image mode is one of a multi-viewpoint image mode and a 2D/3D image mode, and
   in the multi-viewpoint image mode, the method includes selecting viewpoints of eyes at the user's position point from multi-viewpoints with reference to the second image change gap and displaying 3D image data corresponding to the selected viewpoints of the eyes at the user's position point, and
   in the 2D/3D image mode, the method includes selecting a corresponding area according to the user's position point from a normal area and abnormal area for 3D viewing with reference to the second image change gap, and displaying the input video signal as 2D image data or 3D image data converted from the 2D image data.

15. The method of claim 11, wherein
   the image mode includes a multi-viewpoint image mode and a 2D/3D image mode, and
   in the multi-viewpoint image mode, the method includes generating the first lengths of the first image change gap and the second lengths of the second image change gap corresponding to a plurality of respective viewpoints by dividing an entire viewing angle by a predetermined first angle with reference to a reference distance between the user and the stereoscopic image display device,
   while in the 2D/3D image mode, the method includes generating the first lengths of the first image change gap and the second lengths of the second image change gap corresponding to a normal area and an abnormal area for 3D viewing by dividing the entire viewing angle with reference to the reference distance.

16. The method of claim 11, wherein the first image change gap is set when the user inputs a reference input value for the image mode.

17. The method of claim 16, wherein, when the selected image mode is a multi-viewpoint image mode, the reference input value includes the user's reference distance for the display image, an entire viewing angle, a number of multi-viewpoints, and an angle for a single viewpoint when the entire viewing angle is divided by the multi-viewpoints.

18. The method of claim 16, wherein when the image mode is a 2D/3D image mode, the reference input value includes the user's reference distance for the display image, an entire viewing angle, an angle of a normal area for 3D viewing, and an angle of an abnormal area for 3D viewing.

19. The method of claim 11, wherein generating image data of the first image mode includes, when the first image mode is a multi-viewpoint image mode, receiving 3D image data for a viewpoint that corresponds to the user's position point, the 3D image data converted from an input video signal and then stored, or receiving the 3D image data that are converted in real-time from the input video signal according to the viewpoint that corresponds to the user's position point.

20. The method of claim 11, wherein generating image data of the first image mode includes, when the first image mode is a 2D/3D image mode, receiving 3D image data that are stored or converted in real-time according to the corresponding area following the user's position point from among a normal area and an abnormal area for 3D viewing, or receiving 2D image data of an input video signal.

* * * * *